United States Patent
Lei et al.

(10) Patent No.: US 7,228,300 B2
(45) Date of Patent: Jun. 5, 2007

(54) CACHING THE RESULTS OF SECURITY POLICY FUNCTIONS

(75) Inventors: Chon Hei Lei, Alameda, CA (US); Daniel Manhung Wong, Sacramento, CA (US)

(73) Assignee: Oracle International Corporation, Redwood Shores, CA (US)

( * ) Notice: Subject to any disclaimer, the term of this patent is extended or adjusted under 35 U.S.C. 154(b) by 323 days.

(21) Appl. No.: 10/431,972

(22) Filed: May 7, 2003

(65) Prior Publication Data

US 2003/0236781 A1    Dec. 25, 2003

Related U.S. Application Data

(63) Continuation-in-part of application No. 10/247,323, filed on Sep. 18, 2002, now Pat. No. 6,631,371, which is a continuation of application No. 09/167,092, filed on Oct. 5, 1998, now Pat. No. 6,487,552, said application No. 10/431,972 is a continuation-in-part of application No. 09/872,896, filed on May 31, 2001, now Pat. No. 6,587,854, which is a continuation-in-part of application No. 09/589,602, filed on Jun. 7, 2000, now Pat. No. 6,578,037.

(51) Int. Cl.
*G06F 17/30*    (2006.01)

(52) U.S. Cl. .............................................. 707/3; 707/4

(58) Field of Classification Search ................. 707/1, 707/3–5
See application file for complete search history.

(56) References Cited

U.S. PATENT DOCUMENTS 5,133,075 A    7/1992    Risch
(Continued)

FOREIGN PATENT DOCUMENTS

EP    1 089 194 A2    4/2001
(Continued)

OTHER PUBLICATIONS

Michael Stonebraker et al., "Access Control in a Relational Data Base Management System by Query Modification," ACM/CSC-ER, 1974, XP-002319462, pp. 180-186.
(Continued)

*Primary Examiner*—Alford W. Kindred
(74) *Attorney, Agent, or Firm*—Hickman Palermo Truong & Becker LLP

(57) ABSTRACT

A fine-grained access control mechanism uses policy functions that are associated with a database object (e.g. table and view). The policy functions are invoked, when, for example, a database server detects that a query is issued against the database object. The value of a policy function remains constant under certain conditions. For example, once a database server is brought up, the value of a policy function may remain the same. Users can specify the conditions under which the value of a policy function remain constant. Based on this information, when a policy function is computed while processing a query, the database server caches the value of the policy function. When processing another query that requires the value of the policy function, the database server retrieves the result from the cache rather than re-computing the policy function, as long as the condition under which the policy function remains constant persists.

38 Claims, 4 Drawing Sheets

U.S. PATENT DOCUMENTS

| | | | |
|---|---|---|---|
| 5,241,305 A | 8/1993 | Fascenda et al. | |
| 5,265,221 A | 11/1993 | Miller | |
| 5,276,901 A | 1/1994 | Howell et al. | |
| 5,428,778 A | 6/1995 | Brookes | |
| 5,499,368 A | 3/1996 | Tate et al. | |
| 5,748,899 A | 5/1998 | Aldrich | |
| 5,751,949 A | 5/1998 | Thomson et al. | |
| 5,765,154 A | 6/1998 | Horikiri et al. | |
| 5,787,428 A | 7/1998 | Hart | |
| 5,815,574 A | 9/1998 | Fortinsky | |
| 5,940,818 A | 8/1999 | Malloy et al. | |
| 5,963,932 A | 10/1999 | Jakobsson et al. | |
| 5,963,935 A | 10/1999 | Ozbutun et al. | |
| 5,974,408 A | 10/1999 | Cohen et al. | |
| 5,991,754 A | 11/1999 | Raitto et al. | |
| 6,026,388 A | 2/2000 | Liddy et al. | |
| 6,026,391 A | 2/2000 | Osborn et al. | |
| 6,067,540 A | 5/2000 | Ozbutun et al. | |
| 6,081,800 A | 6/2000 | Ozbutun et al. | |
| 6,098,081 A | 8/2000 | Heidorn | |
| 6,134,549 A | 10/2000 | Regnier et al. | |
| 6,134,559 A | 10/2000 | Brumme et al. | |
| 6,138,120 A | 10/2000 | Gongwer et al. | |
| 6,141,656 A | 10/2000 | Ozbutun et al. | |
| 6,144,957 A | 11/2000 | Cohen et al. | |
| 6,163,858 A | 12/2000 | Bodamer | |
| 6,167,517 A | 12/2000 | Gilchrist et al. | |
| 6,182,277 B1 | 1/2001 | DeGroot et al. | |
| 6,195,656 B1 | 2/2001 | Ozbutun et al. | |
| 6,205,442 B1 | 3/2001 | Cohen et al. | |
| 6,212,578 B1 | 4/2001 | Racicot et al. | |
| 6,219,666 B1 | 4/2001 | Krishnaswamy et al. | |
| 6,253,203 B1 | 6/2001 | O'Flaherty et al. | 707/9 |
| 6,266,662 B1 | 7/2001 | Ozbutun et al. | |
| 6,275,824 B1 | 8/2001 | O'Flaherty et al. | |
| 6,275,830 B1 | 8/2001 | Muthukkaruppan et al. | |
| 6,304,974 B1 | 10/2001 | Samar | |
| 6,308,273 B1 | 10/2001 | Goertzel et al. | |
| 6,314,419 B1 | 11/2001 | Faisal | |
| 6,321,238 B1 | 11/2001 | Putzolu | |
| 6,341,281 B1 | 1/2002 | MacNicol et al. | |
| 6,341,340 B1 | 1/2002 | Tsukerman et al. | |
| 6,351,742 B1 | 2/2002 | Agarwal et al. | |
| 6,363,387 B1 | 3/2002 | Ponnekanti et al. | |
| 6,370,522 B1 | 4/2002 | Agarwal et al. | |
| 6,401,083 B1 | 6/2002 | Agarwal et al. | |
| 6,418,430 B1 | 7/2002 | DeFazio et al. | |
| 6,421,666 B1 | 7/2002 | Murthy et al. | |
| 6,430,550 B1 | 8/2002 | Leo et al. | |
| 6,457,020 B1 | 9/2002 | Carey et al. | |
| 6,466,931 B1 | 10/2002 | Attaluri et al. | |
| 6,477,525 B1 | 11/2002 | Bello et al. | |
| 6,484,179 B1 | 11/2002 | Roccaforte | |
| 6,487,552 B1 | 11/2002 | Lei et al. | |
| 6,487,641 B1 | 11/2002 | Cusson et al. | |
| 6,493,710 B1 | 12/2002 | Gollapudi et al. | |
| 6,493,722 B1 | 12/2002 | Daleen et al. | |
| 6,496,819 B1 | 12/2002 | Bello et al. | |
| 6,510,504 B2 | 1/2003 | Satyanarayanan | |
| 6,529,885 B1 | 3/2003 | Johnson | |
| 6,539,398 B1 | 3/2003 | Hannan et al. | |
| 6,546,382 B1 | 4/2003 | Amor et al. | |
| 6,546,394 B1 | 4/2003 | Chong et al. | |
| 6,549,916 B1 | 4/2003 | Sedlar | |
| 6,578,037 B1 | 6/2003 | Wing et al. | |
| 6,581,055 B1 | 6/2003 | Ziauddin et al. | |
| 6,587,854 B1 | 7/2003 | Guthrie et al. | 707/9 |
| 6,601,071 B1 | 7/2003 | Bowker et al. | |
| 6,609,121 B1 | 8/2003 | Ambrosini et al. | |
| 6,609,131 B1 | 8/2003 | Zait et al. | |
| 6,615,206 B1 | 9/2003 | Jakobsson et al. | |
| 6,618,721 B1 | 9/2003 | Lee | |
| 6,622,138 B1 | 9/2003 | Bellamkonda et al. | |
| 6,631,371 B1 | 10/2003 | Lei et al. | |
| 6,636,870 B2 | 10/2003 | Roccaforte | |
| 6,658,405 B1 | 12/2003 | Ozbutun | |
| 6,665,684 B2 | 12/2003 | Zait et al. | |
| 6,678,822 B1 | 1/2004 | Morar et al. | |
| 6,684,203 B1 | 1/2004 | Waddington et al. | |
| 6,684,207 B1 | 1/2004 | Greenfield et al. | |
| 6,684,227 B2 | 1/2004 | Duxbury | |
| 6,691,099 B1 | 2/2004 | Mozes | |
| 6,691,118 B1 | 2/2004 | Gongwer et al. | |
| 6,694,306 B1 | 2/2004 | Nishizawa et al. | |
| 6,708,185 B2 | 3/2004 | Harris | |
| 6,711,571 B2 | 3/2004 | Putzolu et al. | |
| 6,732,085 B1 | 5/2004 | Mozes | |
| 6,738,782 B2 | 5/2004 | Agarwal et al. | |
| 6,741,997 B1 | 5/2004 | Liu et al. | |
| 6,847,998 B1 | 1/2005 | Arcieri et al. | |
| 6,901,410 B2 * | 5/2005 | Marron et al. | 707/104.1 |
| 6,920,457 B2 | 7/2005 | Pressmar | |
| 6,986,060 B1 | 1/2006 | Wong | |
| 7,035,846 B2 | 4/2006 | Gupta et al. | |
| 2002/0002613 A1 * | 1/2002 | Freeman et al. | 709/225 |
| 2002/0038300 A1 * | 3/2002 | Iwata et al. | 707/5 |
| 2002/059203 A1 | 5/2002 | Witkowski et al. | |
| 2002/0095405 A1 | 7/2002 | Fujiwara | |
| 2003/0014394 A1 | 1/2003 | Fujiwara et al. | |
| 2003/0055832 A1 | 3/2003 | Roccaforte | |
| 2003/0208503 A1 | 11/2003 | Roccaforte | |
| 2003/0212694 A1 | 11/2003 | Potapov et al. | |
| 2003/0236780 A1 | 12/2003 | Saha et al. | |
| 2003/0236781 A1 | 12/2003 | Lei et al. | |
| 2003/0236782 A1 | 12/2003 | Wong et al. | |
| 2004/0111375 A1 | 6/2004 | Johnson | |
| 2004/0139043 A1 | 7/2004 | Lei et al. | |
| 2005/0203878 A1 | 9/2005 | Brill et al. | |

FOREIGN PATENT DOCUMENTS

| | | |
|---|---|---|
| EP | 2002312220 | 10/2002 |
| JP | 2002/312220 | 10/2002 |

OTHER PUBLICATIONS

T.F. Keefe et al., "Secure Query-Processing Strategies," IEEE, No. 3, Mar. 1989, XP 000122365, pp. 63-70.

International Search Authority, "Notification of Transmittal of the International Search Report and the Written Opinion of the International Searching Authority, or the Declaration," International Apllication No. PCT/US2004/043480, Apr. 22, 2005, 12 pages.

Current Claims Of International Application No. PCT/US2004/043480, pp. 1-6.

International Preliminary Examing Authority, "Written Opinion", PCT/US2003/041541, mailing date Sep. 1, 2005, 6 pages.

Current Claims PCT/US2003/041541, 3 pages.

Motro, Amihai, "An Access Authorization Model for Relational Databases Based on Algebraic Manipulation of View Definitions," Data Engineering, 1989, XP010015183.

Anton, Jesse, et al., "Web Caching for Database Applications with Oracle Web Cache," ACM SIGMOD 2002, Jun. 4-6, 2002, Madison, Wisconsin, 6 pages.

El Zanfaly, Doan S. et al., "Multi Level Caching to Speedup Query Proceeding in Distributed Databases," Signal Processing and Information Technology, 2003, Proceeding of the 3rd IEEE International Symposium, Darmstadt, Germany 2003, XP-010729221, pp. 580-583.

Gupta, Amit et al., "Query Scheduling in Multi Query Optimization," Database Engineering & Applications, 2001, International Symposium on Jul. 16-18, 2001, XP-010554363, pp. 11-19.

Malladi, Rajeswari et al., "Applying Multiple Query Optimization in Mobile Databases," System Sciences 2003, Proceedings of the 36th Annual Hawaii International Conference 2003, XP-010636732, pp. 294-303.

MySQL, "MySQL Manual, 5.10 the MySQL Query Cache," http://dev.mysql.com/doc/mysql/en/Query_Cache.html, data retrieved Jun. 24, 2004, pp. 1-3 and 129-133.

Oracle Corporation, "Oracle 8i, Concepts," Release 2 (8.1.6), Dec. 1999, Part No. A76965-01, pp. x-xxv, 22-1-22-11 and 24-1-24-39.

Oracle Corporation, "Key Considerations," Oracle 9iAS Containers for J2EE Support for JavaServer Pages Reference, Release 2 (9.0.2), Part No. A95882-01, 2000, 2002, http://download-west.oracle.com/docs/cd/A97329_01/web.902/a95882/keydev.htm#10215, data retrieved Jun. 24, 2004, pp. 1-22.

Oracle Corporation, "Basic Programming Considerations," Oracle Application Server Containers for J2EE Support for JavaServer Pages Developer's Guide, 10g (9.0.4), Part No. B10320-01, 2000, 2003, http://download-west.oracle.com/docs/cd/B10464_01/web.904/b10320/basics.htm#1009139, data retrieved Jun. 24, 2004, pp. 1-20.

Oracle Corporation, "Key Considerations," Oracle9i Support for JavaServer Pages Reference, Release 2 (9.2), Part No. A96657-01, 2000, 2002, http://download-west.oracle.com/docs/cd/B10501_01/java.920/a96657/keydev.htm#10171, data retrieved Jun. 24, 2004, pp. 1-20.

Oracle Corporation, "Sample Illustrating Statement Caching Support in Oracle9i JDBC Drivers," 2004, http://otn.oracle.com/sample_code/tech/java/sqlj_jdbc/files/jdbc30/StmtCacheSample/Readme.html?_template=/otn/content/print, data retrieved Jun. 24, 2004, pp. 1-7.

Oracle Corporation, "JINT Demo: Accelerate Performance with Oracle 9iAS Web Cache," 2004, http://otn.oracle.com/sample_code/tech/java/j2ee/jintdemo/tutorials/webcache.html?_temp, data retrieved Jun. 24, 2004, pp. 1-6.

Park, Jooseok, et al., "Using Common Subexpressions to Optimize Multiple Queries," Data Engineering 1988, Proceedings of the International Conference, Los Angeles CA., 1988, XP-010011428, pp. 311-319.

Xiang Liu, "Developing High Performance Applications with Oracle 9iAS Web Cache and ESI," Oracle Corporation, Paper 28426, pp. 1-15.

International Searching Authority, "Notification of Transmittal of the International Search Report and the Written Opinion of the International Searching Authority, or the Declaration," PCT/US2005/013648, mailing date Aug. 30, 2005, 13 pages.

Current Claims, PCT/US2005/013648, 4 pages.

* cited by examiner

FIG. 2

TABLE 201

| POLICY TYPE | DESCRIPTION<br>(For all types function, value is constant as specified below until function is altered.) |
|---|---|
| STATIC | For a given database object, value of function is constant, unless function is changed. Once database server computes function value and stores in cache, database server retrieves values from cache when value subsequently needed for another query that accesses the database object. |
| STATIC SHARED | Value of function constant for all database objects. Once database server computes function value and stores in cache, database server retrieves values from cache when value subsequently needed for another query. |
| SESSION | For a given database object, value of function constant within a session for all database objects, unless user context is changed. During a given session, once database server computes function value and stores in cache, database server retrieves values from cache when value subsequently needed for another query during session. |
| SESSION SHARED | Value of function constant within a session for all database objects, unless user context is changed. During a given session, once database server computes function value and stores in cache, database server retrieves values from cache when value subsequently needed for another query during session. |
| DYNAMIC | Function is always computed when a query is received. | policy function foo 300 foo(in schema, in dbObject, out optmizerHint)
begin
  if dbObject != 'employee return " ";
  if dbObject = 'employee' & time > 5pm
    return '1 = 2';
  else
    if userContext.region = "US"
      optimizerHint = "partition('us')"
      return "region = 'us'";
    If userContext.region = "UK"
      optimizerHint = "partition('uk')"
      return "region = 'uk'";
return " ";
end ;

"optimizer hints, which are added to a query"

FIG. 3

CACHING THE RESULTS OF SECURITY POLICY FUNCTIONS

RELATED APPLICATION

The present application claims priority to the following previously filed applications: the present application is a continuation-in-part of U.S. application Ser. No. 10/247,323, filed Sep. 18, 2002, now U.S. Pat. No. 6,631,371 entitled Database Fine-Grained Access Control, and naming as inventors Chon Hei Lei and Douglas James McMahon, the entire disclosure of which is hereby incorporated herein by reference, which is continuation of U.S. application Ser. No. 09/167,092, filed Oct. 5, 1998, now U.S. Pat. No. 6,487,552 entitled Database Fine-Grained Access Control, and naming as inventors Chon Hei Lei and Douglas James McMahon, the entire disclosure of which is hereby incorporated herein by reference; the present application is a continuation-in-part of U.S. application Ser. No. 09/589,602, filed Jun. 7, 2000, now U.S. Pat. No. 6,578,037 entitled Partitioned Access Control To A Database, and naming as inventors Daniel ManHung Wong, Chon Hei Lei, the entire disclosure of which is hereby incorporated herein by reference; the present application is a continuation-in-part of U.S. application Ser. No. 09/872,896, filed May 31, 2001, now U.S. Pat. No. 6,587,854 entitled Virtually Partitioning User Data In A Databave System, and naming as inventors Christine Pae Guthrie, Jeaper Andersen, Chon Hei Lei and Douglas James McMahon, the entire disclosure of which is hereby incorporated herein by reference.

This application is related to U.S. application Ser. No. 10/377,366, filed Feb. 27, 2003, entitled Enforcing Data Privacy Aggregations, and naming as inventors Daniel Man-Hung Wong, Chon Hei Lei and Rama Vissapragada, the entire disclosure of which is hereby incorporated herein by reference.

FIELD OF THE INVENTION

The present invention relates to database systems.

BACKGROUND OF THE INVENTION

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A database server stores data in one or more data containers, each container contains records, and the data within each record is organized into one or more fields. In a database system that stores data in a relational database, the data containers are referred to as tables, the records are referred to as rows, and the attributes are referred to as columns. In object oriented databases, the data containers are referred to as object classes, the records are referred to as objects, and the attributes are referred to as object attributes. Other database architectures may use other terminology.

The present invention is not limited to any particular type of data container or database architecture. However, for the purpose of explanation, the examples and the terminology used herein shall be that typically associated with relational databases. Thus, the terms "table", "row" and "column" shall be used herein to refer respectively to the data container, record, and field.

A DBMS retrieves and manipulates data in response to receiving a database statement. Typically the database statement conforms to a database language, such as Structured Query Language (SQL). A database statement can specify a query operation, a data manipulation operation, or a combination thereof. A database statement that specifies a query operation is referred to herein as a query. The present invention is not limited to database statements that specify a particular type of operation. However, for the purpose of explanation, embodiments of the present invention are illustrated using queries.

One of the most important functions in a database server is to control access to database data. Security mechanisms on database servers control what data may be accessed by a query issued by a user. A very powerful type of security mechanism is referred as a fine-grained access control mechanism. Fine-grained access control allows important capabilities. These include row-level filtering, as described in Database Fine-Grained Access Control (both applications), virtual partitioning of user data in a table as described in Partitioned Access Control To A Database, and controlling access to aggregate information, as described in Enforcing Data Privacy Aggregations.

FINE-GRAINED ACCESS CONTROL MECHANISM

A fine-grained access control mechanism uses one or more policy functions that are associated with a database object (e.g. table and view). The policy functions are invoked, when, for example, a database server detects that a query is issued against the database object. The policy function returns a predicate that is appended to the query to generate a modified query. The predicate restricts access to data according to a policy implemented in one or more of the invoked policy functions. In addition, a policy function can also modify context information associated with a user which can affect subsequent database access control. In this way, user access is transparently restricted by transparently modifying queries issued by users to limit access to their data.

Policy functions can be implemented in a variety of ways. According to an embodiment, policy functions are implemented as stored procedures which are associated with a policy for a table or view through an administrative interface. The stored procedures are not native software of the database server, but are user supplied. A system package may be used to define an API through which policy functions may be administered. The database server is designed to interface with the policy functions through the API. A user may register a policy function by invoking a database server procedure for registering the policy functions in a system package.

For convenience of expression, various entities that represent sets of instructions (e.g. functions, queries) are described as performing actions, when in fact, a computer, process, database server, or other executing entity performs those actions in response to executing or interpreting the set of instructions. For example, a function may be described as determining that a condition exists or a query may be described as accessing information. These are just convenient ways of expressing that a computer, process, database, server or other executing entity is determining that a condition exists in response to executing a function or is accessing data in response to executing or computing a query.

Despite its power and flexibility, fine-grained access control has some drawbacks. Evaluating a policy function requires a non-negligible amount of work. Because one or more policy functions associated with a database object can be invoked by a database server anytime it detects that a query is issued against the database object, considerable overhead can be added to processing the query.

Furthermore, fine-grained access control complicates or hinders a powerful optimization technique that uses optimizer hints. Optimizer hints are commands that can be added to a database statement to instruct or guide how the query optimizer should execute a query. A query optimizer is a component of a database server that generates an execution plan to execute queries received by the database server. An execution plan defines the steps and operations performed by a database server to process a query. A query optimizer generates execution plans that are optimized for efficiency. When determining what steps to include in an execution plan, and the order in which the steps are performed, a query optimizer accounts for many factors that affect efficiency. These factors include optimizer hints included in the query. For example, an optimizer hint in a query can specify to use a particular index. Based on the fact the query includes the optimizer hint, the query optimizer generates an execution plan that includes a step for scanning the index. Optimizer hints are described in greater detail in Oracle 9i Database Performance Guide and Reference, Release 1 (9.0.1), Part Number A87503-02, the contents of which are incorporated herein by reference.

In general, database users add optimizer hints to queries assuming the queries will not be modified by adding predicates. However, under fine-grained access control, this assumption does not hold true. In fact, a user may not be able predict what predicates a fine-grained access control mechanism will add, and may not even be aware that the predicates could be added, and when they may be added. Optimizer hints may be used for queries based on assumptions that are invalid; reliance on such assumptions may in fact worsen execution of a query. Further, because the user is not able to anticipate the predicates to be added, the user is unable to take of advantage of predicates when analyzing a query to determine what hints can be added to more efficiently execute a query.

Based on the foregoing, clearly there is a need for a mechanism that allows policy functions to be evaluated more efficiently and that improves the users ability to take advantage of optimizer hints in environments that use fine-grained access control.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2 is a table depicting policy function types according to an embodiment of the present invention.

FIG. 3 is a diagram depicting a policy function configured to return hints according to an embodiment of the present invention.

DETAILED DESCRIPTION OF THE INVENTION

A method and apparatus that allows policy functions to be used more efficiently is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

The value of a policy function remains constant under certain conditions. For example, once a database server is brought up, the value of a policy function may remain the same. Techniques described in here allow users to specify the conditions under which the value of a policy function remain constant. Based on this information, when a policy function is computed while processing a query, the database server may cache the value of the policy function. When processing another query that requires the value of the policy function, the database server retrieves the result from the cache rather than re-computing the policy function, as long as the condition under which the policy function remains constant persists. Finally, policy functions can return optimizer hints, which are then added to the query.

Exemplary Fine Grain Access Control Mechanism

Figure 1:
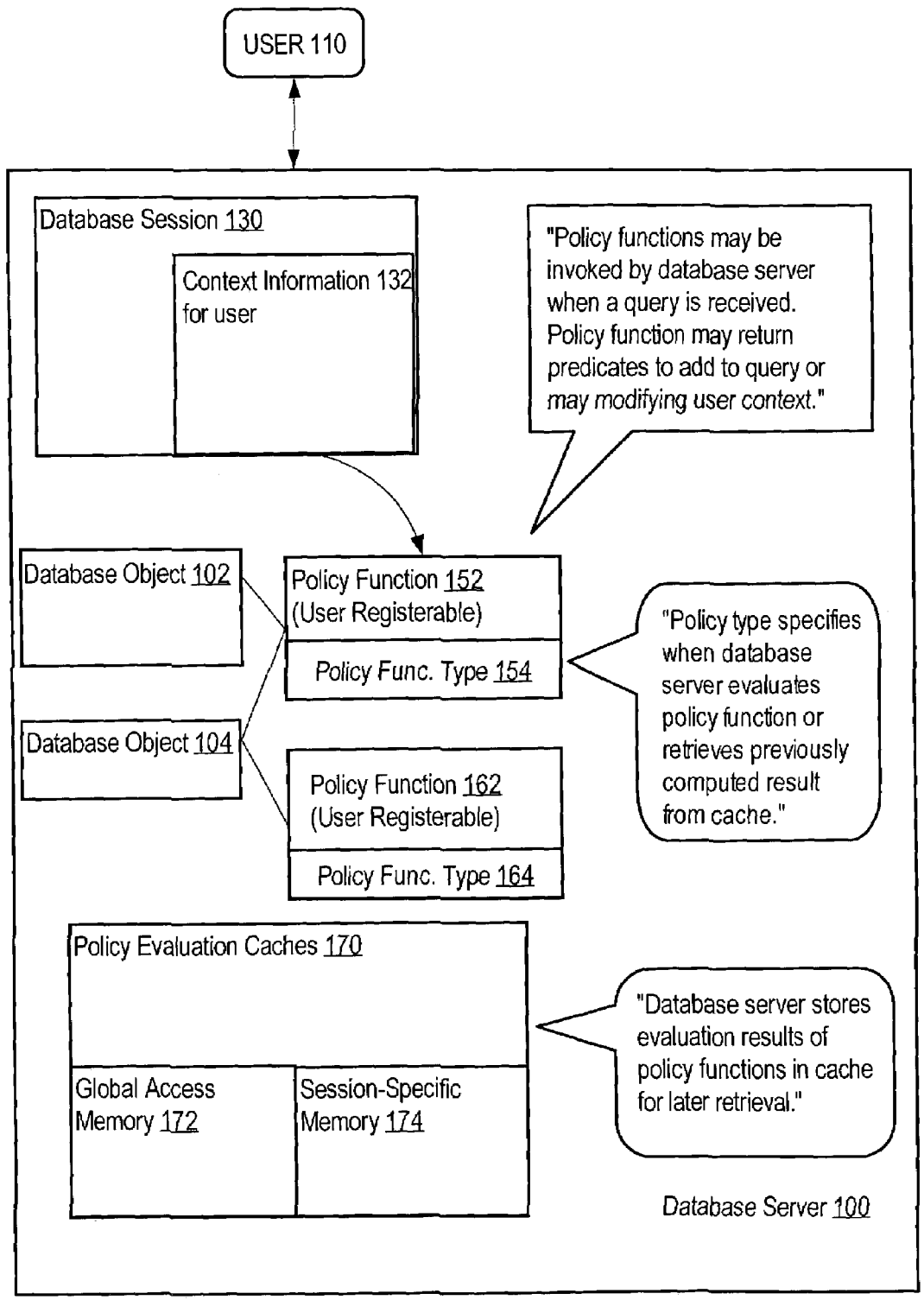
FIG. 1 is a block diagram depicting a fine-grained access control mechanism using policy functions associated with policy function types according to an embodiment of the present invention.

FIG. 1 shows a database server and components used by a fine-grain control access mechanism on the database server, upon which an embodiment of the present invention may be implemented. Referring to FIG. 1, it shows database server 100, which manages access to database objects. A database object may be, for example, a relational or object table, or a view. Among these database objects are database object 102 and database object 104.

User 110 interacts with database server 100 by issuing queries, the results of which are computed by database server 100 and returned to user 110. A user may be any type of database client, including one or more processes running on the same or a different computer system as database server 100, and one or more processes executing an application or a user interface through which a user interacts to issue queries.

To control access to database objects using a fine-grained access control mechanism, a policy function is associated with the database object so that it is invoked for queries that require access to the table. To this end, database server 100 stores data that associates database object 102 with both policy function 152 and 162 and database object 104 with only policy function 162.

Policy function 152 and policy function 162 are associated with a policy function type 154 and 164, respectively. A policy function type is metadata that indicates the one or more conditions under which the value of a policy function remains constant, that is, the one or more conditions under which multiple computations of the policy function by the database server yields the same result for the function. The policy function type of a policy function is specified by the user when invoking a database server administrative procedure to register a policy function. In response to receiving user input in this form, database server 100 stores data that specifies the policy function type of a policy function. Different kinds of policy function types are described in greater detail later.

A session, such as database session 130, is a particular connection established for a user, such as an application or another database server, through which a series of requests may be made. The requests are carried out by one or more session processes. The requests, which may be in the form of function or remote procedure invocations, include requests to execute queries, to begin execution of a transaction, to perform updates and other types of transaction operations, to commit or otherwise terminate a transaction, and to terminate a database session.

The database server on which a database session is established maintains session state data that reflects the current state of a database session. Among this information is user context information, such as user context information 132.

User context information is data which is maintained by database server 100 and that is associated with a user's database session. A policy function may access and change context information through the aforementioned API for policy functions. Users may also transmit requests to database server 100 to access and change user context information. The ability of a policy function and user to change context information in this way is subject to constraints that are imposed by database server 100 for security purposes. Context information 132 contains various attributes, such as a user id identifying the user associated with the session.

Database server 100 caches the computed values in policy evaluation caches 170. Policy evaluation caches 170 include multiple caches in various types of memory on database server 100. These types of memory include global access memory 172 and session-specific memory 174. Session-specific memory 174 includes multiple areas of memories that are each associated with a particular session and to which access is restricted based on the particular session associated with a process. Global area memory includes one or more areas of memory that may be accessed by processes associated with any session, or by processes not associated with any session at all. A cache in session-specific memory 175 is referred to herein as a session cache. A cache in global access memory 172 is referred to herein as a global cache.

Policy Function Types

FIG. 2 shows a table that summarizes a set of policy function types that may be used in an embodiment of the present invention. Referring to FIG. 2, it shows five basic types of policy function types: Static, Static Shared, Session, Session Shared, and Dynamic.

The Static policy function type specifies that for a given database object, the value of the function is constant, unless the function is changed by, for example, a user registering a new version of the policy function. Once the value of a policy function is computed for a database object, the value is stored in global cache in association with the policy function and the database object. When a query that requires access to the database object is processed by database server 100, it retrieves the stored value from the global cache rather than re-computing the policy function.

For purposes of illustration, policy function type 154 of policy function 152 is Static. Database server 100 receives a query that requires access to database object 102 from a user A. Database server 100 determines that the policy function type of policy function 152 is Static. It therefore examines global cache to find a value that is stored therein in association with policy function 152 and database object 102. Finding no such value there, database server 100 computes the value for the policy function 152 and then stores it in global cache in association with the policy function 152 and database object 102. Subsequently, database server 100 receives a query from a user B. The query also requires access to database object 102. Database server 100 examines the global cache, finds that a value is stored therein for policy function 152 and database object 102. Accordingly, database server 100 uses this value as the value of policy function 152.

Next, database server 100 receives a query from user A. The query requires access to database object 104. While global cache contains a value for policy function 152, the value is stored in association with database object 102 not database object 104. Therefore, when database server 100 examines the global cache, it does not find a value that is stored therein for policy function 152 and database object 104. Accordingly, database server 100 computes the value for the function and then stores it in global cache in association with policy function 152 and database object 104.

As alluded to earlier, a change to a policy function of the type Static may affect the value of the function. Other policy function types are affected in this way as well. When a change to a policy function may affect its value, any value cached for it may not be correct and the function should be re-computed. To ensure policy functions that are changed are recomputed, any entry for the policy function stored in policy evaluation caches 170 is removed or invalidated. Database server 100 re-computes a policy function when it determines that a value for the policy function is not stored in policy evaluation caches 170.

The Static Shared policy function type specifies that the value of the function is constant for all database objects. Thus, once computed for any database object and stored in policy evaluation caches 170, when database server 100 processes a query that requires the value of the function and access to any database object that is processed, database server 100 retrieves the stored value from global cache rather than re-computing the function.

The Session policy function type specifies that the value of a function remains constant during a session for a particular user for a database object with which the policy function is associated, unless the user context associated with the session is changed. During a given session, once the database server computes the value of a policy function for a database object, the database server stores it in the session cache associated with the session. Database server 100 retrieves the values from the cache when the value is subsequently needed for another query requiring the value during the session, unless the database server has detected that the user context has changed.

For purposes of illustration, policy function type 154 of policy function 152 is Session. Database server 100 receives a query that requires access to database object 102 from user A associated with session A. Database server 100 determines that the policy function type of policy function 152 is Session. It therefore examines session cache associated with session A to find a value that is stored therein in association with policy function 152 and database object 102. Finding no such value there, database server 100 computes the value for policy function 152 and then stores it in the session cache in association with policy function 152 and database object 102. While this value is stored in the session cache associated with session A, database server 100 receives a query that requires access to database object 102 from a user B associated with session B. Database server 100 determines that the policy function type 154 of policy function 152 is Session. It therefore examines session cache associated with session B to search for a value that is stored therein in association with policy function 152 and database object 102. Finding no such value there, database server 100 computes the value for the policy function 152 and then stores it in the session cache of session B in association with the policy function 152 and database object 102.

The Session Shared policy function type specifies that the value of a function remains constant during a session for a particular user for all database objects, unless the user context is changed. During a given session, once database server 100 computes the value of a policy function and stores it in a session cache associated with the session, database server 100 retrieves the value from the cache when the value of the policy function is subsequently needed for another query during the session, unless the database server has detected that the user context has changed.

The present invention has been illustrated using a technique of associating policy function values with a session by storing those values in a cache that is associated with only the session. However, the present invention is not so limited. For example, the value for a policy function having the policy function type Session may be stored in global cache, where the value is stored in association with the session as well as the database object and policy function. The present invention is not limited to any particular method of caching values for policy functions.

The Dynamic policy function type specifies that the value should always be computed for each query.

An embodiment has been illustrated using policy function types that specify when the value for a function may change. In an alternate embodiment, a user may indicate when any type of function output may change. Output of a function includes, for example, values passed back as parameters or arguments of the function, or some action performed or triggered by the function. Therefore, it should be understood that the present invention is not limited to policy function types that specify only when the value of a function changes.

Policy Functions that Return Optimizer Hints

FIG. 3 shows a policy function configured to return optimizer hints according to an embodiment of the present invention. Referring to FIG. 3, it depicts policy function foo. Code within the policy function is written in PL/SQL™, but the present invention is not so limited.

Policy function foo returns as its value a predicate, which database server 100 may add to a query. Function foo has three parameters, schema, dbObject, and optimizerHint. In PL/SQL, parameters may have one of three modes: IN, OUT and, IN OUT. Under IN mode, memory allocated to a parameter can only be read by the function. In OUT, memory allocated to a parameter can only be written to by the function. Parameter schema is an IN parameter identifying a schema, parameter dbOjbect is an IN parameter identifying a database object by name. Parameter optimizerHint returns a string that includes one or more hints. The value of the function foo returned is a string representing a predicate to add to the query.

Function foo operates as follows. If the database object name passed in by dbOjbect is not 'employee', then the function value returned is NULL. Otherwise, if the current time is greater than 5 pm, then the function value returned is the predicate expression 1=2.

If on the other hand the time is less than 5 pm, then the function value returned and the value of optimizerHint depends on the region that is associated with the user for which the query is being executed. That region is specified by the value of user context attribute userContext.region. If userContext.region='US', then the function value is set to region='US' and optimizerHint is set to partition(US). This specifies to the query optimizer of database server 100 to access only the table partition holding data for the US region. If userContext.region='UK', then the function value is set to region='UK' and the optimizerHint is set to partition (US). This specifies to the query optimizer of database server 100 to access only the table partition holding data for employees in the region United Kingdom.

As demonstrated above, using a policy function to specify hints has various advantages. Because a policy function is executed during run-time when predicates that are being added to a query are known by the policy function, the policy function can determine what hints to generate based on the particular predicate being added during run-time. Furthermore, information about the run-time environment is available in the user context, and this information may be used to determine what optimizer hints to generate.

An embodiment of the present invention has been illustrated using policy functions that return predicates to add to the query. However, the present invention is not so limited. Hints may be returned by functions as the sole output of the function or as part of the output of the function, in the form of values returned as parameters or as the value of the function, neither must the output contain predicates or any other data relevant to an access policy.

Hardware Overview

Figure 4:
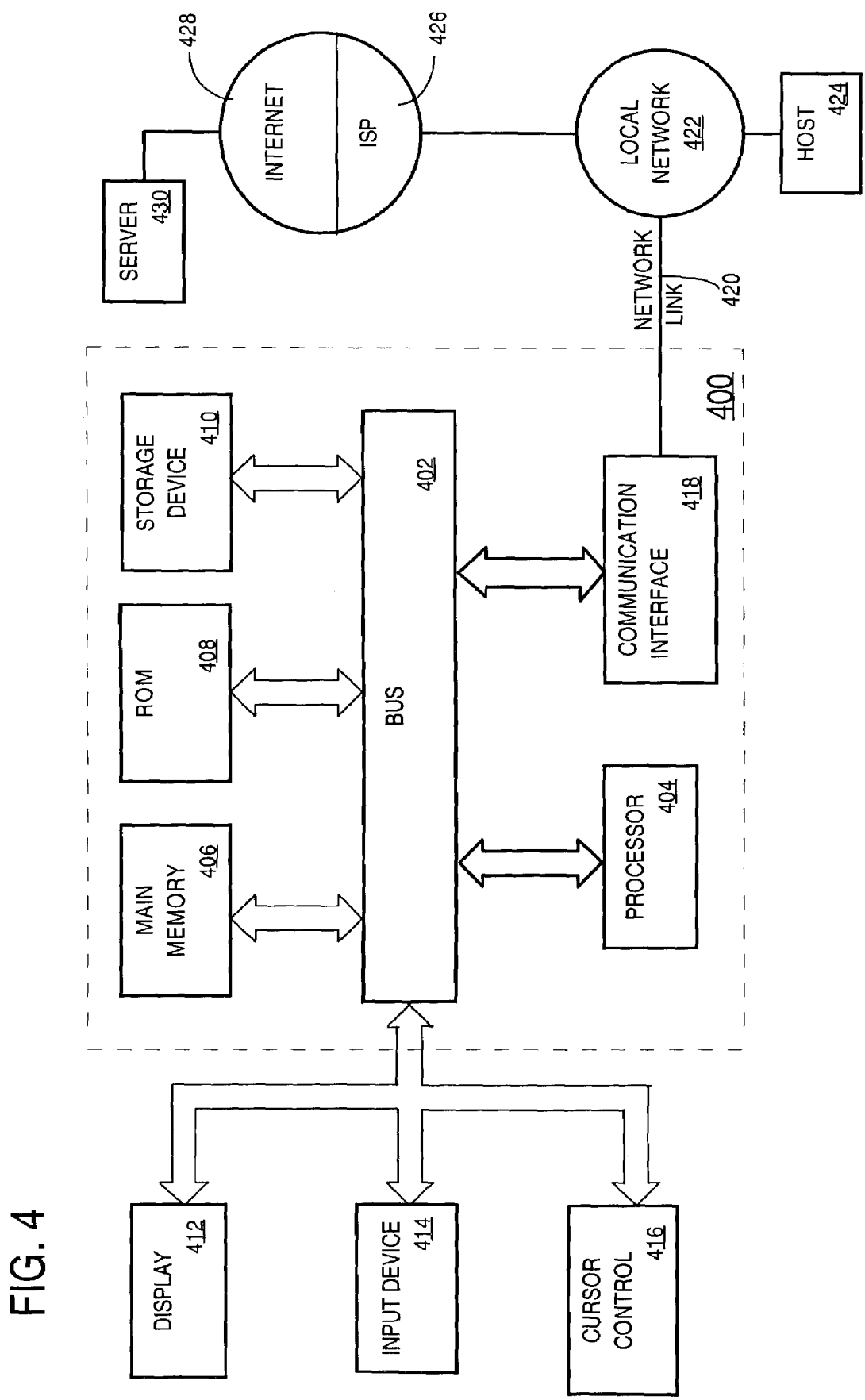
FIG. 4 is a block diagram depicting a computer system which may be used to implement an embodiment of the present invention.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method used for executing queries, the method comprising the steps of:
   storing first data that indicates one or more conditions under which output of a function remains constant;
   in response to receiving a query:
      computing a value of the function, and
      based on said first data, determining whether to store the value in a cache;
      in response to determining to store the value in the cache, storing in the cache the value in association with the function;
   after performing the step of storing, receiving a second query, wherein processing the second query requires the output of the function; and
   in response to receiving said second query, determining based on said first data whether to retrieve said value from said cache as the output of said function; and
   in response to determining to retrieve said value from said cache, retrieving said value from said cache.

2. The method of claim 1, wherein:
   the one or more conditions include that the second query access a particular database object; and
   the step of storing in the cache includes storing the value in association with the database object.

3. The method of claim 1, wherein the one or more conditions include that processing the second query requires the value of said function.

4. The method of claim 1, wherein:
   the first query is associated with a session;
   the one or more conditions include that the second query is associated with the session; and
   the step of storing in the cache includes storing the value in association with the session.

5. The method of claim 4, wherein:
the one or more conditions include that the second query access a particular database object; and
the step of storing in the cache includes storing the value in association with the particular database object.

6. The method of claim 4, wherein the step of storing the value in association with the session includes storing the value in memory to which access by a process is restricted based on a particular session associated with the process.

7. The method of claim 1, wherein:
the method includes receiving user input that specifies the one or more conditions; and
said first data is generated in response to receiving said user input.

8. The method of claim 7, wherein said user input identifies a policy function type.

9. The method of claim 1, wherein said value is a string representing a predicate.

10. A computer-readable storage medium carrying one or more sequences of instructions which, when executed by one or more processors, causes the one or more processors to perform the method recited in claim 1.

11. A computer-readable storage medium carrying one or more sequences of instructions which, when executed by one or more processors, causes the one or more processors to perform the method recited in claim 2.

12. A computer-readable storage medium carrying one or more sequences of instructions which, when executed by one or more processors, causes the one or more processors to perform the method recited in claim 3.

13. A computer-readable storage medium carrying one or more sequences of instructions which, when executed by one or more processors, causes the one or more processors to perform the method recited in claim 4.

14. A computer-readable storage medium carrying one or more sequences of instructions which, when executed by one or more processors, causes the one or more processors to perform the method recited in claim 5.

15. A computer-readable storage medium carrying one or more sequences of instructions which, when executed by one or more processors, causes the one or more processors to perform the method recited in claim 6.

16. A computer-readable storage medium carrying one or more sequences of instructions which, when executed by one or more processors, causes the one or more processors to perform the method recited in claim 7.

17. A computer-readable storage medium carrying one or more sequences of instructions which, when executed by one or more processors, causes the one or more processors to perform the method recited in claim 8.

18. A computer-readable storage medium carrying one or more sequences of instructions which, when executed by one or more processors, causes the one or more processors to perform the method recited in claim 9.

19. A method used for executing queries, the method comprising the steps of:
means for storing first data that indicates one or more conditions under which output of a function remains constant;
means for, in response to receiving a query:
computing a value of the function, and
based on said first data, determining whether to store the value in a cache;
in response to determining to store the value in the cache, storing in the cache the value in association with the function;
after the step of storing, receiving a second query, wherein processing the second query requires the output of the function; and
means for determining, in response to receiving said second query and based on said first data, whether to retrieve said value from said cache as the output of said function; and
in response to determining to retrieve said value from said cache, retrieving said value from said cache.

20. The method of claim 19, wherein:
the method includes receiving user input that specifies the one or more conditions; and
said first data is generated in response to receiving said user input.

21. A method used for executing queries, the method comprising the steps of:
in response to receiving a query:
computing a value of a function, and
detecting one or more conditions under which the function remains constant;
in response to detecting said one or more conditions under which the function
remains constant, storing in a cache the value in association with the function;
after performing the step of storing, receiving a second query, wherein processing
the second query requires the output of the function;
in response to receiving said second query, determining to retrieve said value
from said cache as the output of said function; and
in response to determining to retrieve said value from said cache, retrieving said
value from said cache.

22. The method of claim 21, wherein: the one or more conditions include that the second query access a particular database object; and
the step of storing in the cache includes storing the value in association with the
database object.

23. The method of claim 21, wherein the one or more conditions include that processing the second query requires the value of said function.

24. The method of claim 21, wherein:
the first query is associated with a session;
the one or more conditions include that the second query is associated with the
session; and
the step of storing in the cache includes storing the value in association with the
session.

25. The method of claim 24, wherein:
the one or more conditions include that the second query access a particular
database object; and
the step of storing in the cache includes storing the value in association with the
particular database object.

26. The method of claim 24, wherein the step of storing the value in association with the session includes storing the value in memory to which access by a process is restricted based on a particular session associated with the process.

27. The method of claim 21, wherein the method includes receiving user input that specifies the one or more conditions.

28. The method of claim 27, wherein said user input identifies a policy function type.

29. The method of claim 21, wherein said value is a string representing a predicate.

30. A computer-readable storage medium carrying one or more sequences of instructions which, when executed by one or more processors, causes the one or more processors to perform the method recited in claim 21.

31. A computer-readable storage medium carrying one or more sequences of instructions which, when executed by one or more processors, causes the one or more processors to perform the method recited in claim 22.

32. A computer-readable storage medium carrying one or more sequences of instructions which, when executed by one or more processors, causes the one or more processors to perform the method recited in claim 23.

33. A computer-readable storage medium carrying one or more sequences of instructions which, when executed by one or more processors, causes the one or more processors to perform the method recited in claim 24.

34. A computer-readable storage medium carrying one or more sequences of instructions which, when executed by one or more processors, causes the one or more processors to perform the method recited in claim 25.

35. A computer-readable storage medium carrying one or more sequences of instructions which, when executed by one or more processors, causes the one or more processors to perform the method recited in claim 26.

36. A computer-readable storage medium carrying one or more sequences of instructions which, when executed by one or more processors, causes the one or more processors to perform the method recited in claim 27.

37. A computer-readable storage medium carrying one or more sequences of instructions which, when executed by one or more processors, causes the one or more processors to perform the method recited in claim 28.

38. A computer-readable storage medium carrying one or more sequences of instructions which, when executed by one or more processors, causes the one or more processors to perform the method recited in claim 29.

* * * * *

UNITED STATES PATENT AND TRADEMARK OFFICE
CERTIFICATE OF CORRECTION

| | |
|---|---|
| PATENT NO. | : 7,228,300 B2 |
| APPLICATION NO. | : 10/431972 |
| DATED | : June 5, 2007 |
| INVENTOR(S) | : Chon Hei Lei et al. |

Page 1 of 1

It is certified that error appears in the above-identified patent and that said Letters Patent is hereby corrected as shown below:

Related U.S. Application Data

On the title page
(63) 6$^{th}$ line: Please delete

"application No. 09/872,896, filed on May 31, 2001, now Pat. No. 6,587,854, which is a continuation-in-part of application No. 09/589,602, filed on Jun. 7, 2000, now Pat. No. 6,578,037" and insert --application No. 09/872,896, filed on May 31, 2001, now Pat. No. 6,587,854, and is a continuation-in-part of application No. 09/589,602, filed on Jun. 7, 2000, now Pat. No. 6,578,037--.

Signed and Sealed this

Twenty-first Day of August, 2007

JON W. DUDAS
*Director of the United States Patent and Trademark Office*